United States Patent
Lill

(10) Patent No.: US 6,897,770 B2
(45) Date of Patent: May 24, 2005

(54) TIRE PRESSURE MONITOR AND LOCATION IDENTIFICATION SYSTEM AND METHOD

(75) Inventor: Thomas M. Lill, Port Huron, MI (US)

(73) Assignee: Delphi Technologies, Inc., Troy, MI (US)

( * ) Notice: Subject to any disclaimer, the term of this patent is extended or adjusted under 35 U.S.C. 154(b) by 209 days.

(21) Appl. No.: 10/042,576

(22) Filed: Jan. 9, 2002

(65) Prior Publication Data

US 2002/0067285 A1 Jun. 6, 2002

Related U.S. Application Data

(63) Continuation of application No. 09/730,992, filed on Dec. 6, 2000, now Pat. No. 6,362,731.

(51) Int. Cl.[7] .......................... B60C 23/00; B60C 23/02
(52) U.S. Cl. ...................... 340/445; 340/442; 340/445; 340/446; 340/447; 340/448; 73/146.2; 73/146.3; 73/146.4; 73/146.5; 73/146.6
(58) Field of Search ...................... 340/442, 445–447, 340/448; 73/146.2, 146.5, 146.4; 152/152.1, 415

(56) References Cited

U.S. PATENT DOCUMENTS

| | | | | |
|---|---|---|---|---|
| 4,695,823 A | * | 9/1987 | Vernon | 340/447 |
| 5,602,524 A | * | 2/1997 | Mock et al. | 340/447 |
| 6,112,585 A | | 9/2000 | Schrottle et al. | 73/146 |
| 6,169,480 B1 | | 1/2001 | Uhl et al. | 340/442 |
| 6,181,241 B1 | * | 1/2001 | Normann et al. | 340/447 |
| 6,194,999 B1 | | 2/2001 | Uhl et al. | 73/146 |
| 6,417,766 B1 | * | 7/2002 | Starkey | 340/447 |
| 6,435,020 B1 | * | 8/2002 | Oldenettel et al. | 73/146.4 |

* cited by examiner

*Primary Examiner*—Jeffery Hofsass
*Assistant Examiner*—Lam Pham
(74) *Attorney, Agent, or Firm*—David P. Wood

(57) ABSTRACT

A method and system for monitoring and reporting vehicle tire pressure information. The system includes tire pressure monitors mounted to the tires of a vehicle. The tire pressure monitors detect tire pressure information from their respective tires and transmit that information to transponders that are fixedly-mounted to the vehicle. Each tire pressure monitor corresponds to a single transponder. When a tire pressure monitor transmits tire pressure information, the corresponding transponder receives the signal and transmits the tire pressure signal along with a unique transponder identification code to a vehicle central system controller. Based upon the transponder identification code, the central controller associates the tire pressure information with a particular tire location. However, under certain conditions, a transmitted tire pressure signal is received by one or more of the non-corresponding transponders as well as the corresponding transponder. To filter out the stray tire pressure signals, each of the receiving transponders detects the strength of the received tire pressure signal. The system then determines which of the receiving transponders is the corresponding transponder based upon the respective signal strengths.

12 Claims, 4 Drawing Sheets

TIRE PRESSURE MONITOR AND LOCATION IDENTIFICATION SYSTEM AND METHOD

This is a continuation application of application Ser. No. 09/730,992 filed on Dec. 6, 2000 now U.S. Pat. No. 6,362,731, the entire disclosure of which is incorporated herein by reference.

FIELD OF THE INVENTION

This invention relates to a system for monitoring tire pressure in wheeled vehicles. More specifically, the invention is directed to a remote tire pressure monitoring system that monitors the tire pressure for each tire and indicates to a vehicle operator the unique location of each tire being monitored.

BACKGROUND OF THE INVENTION

It is known to equip vehicle tires with mechanisms to indicate tire pressure. For example, it has been taught to include tire pressure monitors that sense the air pressure in a tire and to transmit that tire pressure information to a vehicle operator via electronic circuits and radio transmitters. The tire pressure monitors are mounted within the tire air valve stem, and they transmit pressure readings at predetermined time intervals using radio frequency signals directly to a centralized tire pressure monitoring receiver. However, such known tire pressure monitoring systems lack a mechanism for reporting pressure information for specific tires. Accordingly, when the tire pressure monitors communicate that tire pressure is low, the vehicle operator has to manually inspect and determine which specific vehicle tire or tires have low pressure (for example, the right front tire or the spare tire, etc.)

To aid in specific vehicle tire location identification, other tire pressure monitoring systems have been employed that include tire pressure monitors that transmit unique identification codes to a central controller of the vehicle. Using the unique identification code, the central control determines from which of the tires the tire pressure signal was sent. However, there are drawbacks associated with such systems. One such drawback is that the central controller must be re-programmed each time the tires are rotated or otherwise moved from their original locations. This is because the central controller can use the unique identification codes sent by the tire pressure monitors to identify the correct tire location only if the central controller knows in which location the tire is currently mounted. When the tires (and thus the tire pressure monitors) are moved from their original locations on the vehicle, the service person must re-program the central controller so that it will be able to associate a particular monitor code with the correct tire location on the vehicle. This situation is undesirable because proper operation of the tire pressure monitoring system then depends upon periodic human intervention, which introduces a possible area for error or undependability.

To solve this problem, the inventor hereof has previously invented a new tire pressure monitoring and location identification system that is the subject of co-pending U.S. patent application Ser. No. 09/607,302. In this previous patent application, the inventor describes a system wherein each vehicle tire is equipped with a pressure monitor that is capable of sensing and transmitting tire pressure information via radio frequency signals (or inductive, magnetic, ultrasonic, or infra-red signals). For each tire pressure monitor, a corresponding transponder capable of receiving radio frequency (RF) signals is fixedly attached to the vehicle in a proximate location to the corresponding pressure monitor, such as in the corresponding wheel-well. According to this previous invention, each of the transponders has a limited signal reception range so that each transponder only receives tire pressure information from the corresponding pressure monitor. Each of the five transponders (one for each tire, including the spare) includes a unique pre-programmed identification code. When a transponder receives pressure information from its corresponding pressure monitor, the transponder transmits a data packet, which includes both the tire pressure information as well as the corresponding transponder's unique identification code, to a central system receiver in the vehicle. Because all of the transponders are fixedly attached to the vehicle, the central system receiver is able to identify which tire pressure information corresponds to which tire from the transponder identification code.

However, the inventor hereof has now discovered that the transponders sometimes receive stray signals from sources other than their corresponding tire pressure monitors. For example, depending upon the positioning of the vehicle and other factors, the transponder corresponding to the right front tire of the vehicle may receive tire pressure signals from any of the other four tire pressure monitors (including the spare) in addition to the right front tire pressure monitor. Further, if two vehicles having tire pressure monitors are parked near each other, it is possible that a transponder of one of the vehicles may receive signals from pressure monitors installed on the other vehicle. Accordingly, sometimes a transponder may transmit tire pressure information to the vehicle's central system receiver that is not indicative of its corresponding tire.

Thus, there is a need for a further refined tire pressure monitoring system that more accurately and consistently reports tire pressure information corresponding to a particular tire.

SUMMARY OF THE INVENTION

The present invention is directed to a tire pressure monitoring and identification system. The system includes a plurality of tire pressure monitors that transmit tire pressure information that may be received by a plurality of transponders. Each of the transponders is fixedly attached to the vehicle proximate to its respective corresponding tire pressure monitor, such as in the corresponding wheel-well. Each transponder has a unique identification code. When a transponder receives a signal indicative of tire pressure information, it also detects the strength of the received signal and derives a Received Signal Strength Indication (RSSI) value therefrom. The RSSI signal is typically a DC voltage that is indicative of the strength of the tire pressure signal received by the transponder. A tire pressure signal received from a corresponding tire pressure monitor (which is positioned proximate to the receiving transporter) will generally be significantly stronger than a tire pressure signal received from a non-corresponding tire pressure monitor (which is positioned relatively further away). According to the present invention, the system determines if a tire pressure signal received by a particular transponder was actually transmitted by the corresponding tire pressure monitor (as opposed to being a stray signal from a non-corresponding pressure monitor) based upon the comparative strength of the received signal, as measured by the relative magnitude of the RSSI value.

The relative strength of a tire pressure signal received by a particular transponder can be used in a variety of ways to determine if the signal was transmitted by the corresponding tire pressure monitor. According to a first preferred embodiment of the invention, a transponder that receives a tire pressure signal compares the associated RSSI value to a reference value. If the RSSI value is greater than the reference value, then it is determined that the tire pressure signal was transmitted by the corresponding tire pressure monitor, and the transponder transmits the tire pressure signal to a central system receiver. If, on the other hand, the RSSI signal is less than the reference value, then it is determined that the signal received by the transponder was a stray signal from a non-corresponding pressure monitor, and the transponder does not transmit it to the central system receiver. Thus, in the case where a tire pressure monitor transmits a tire pressure signal that is received by multiple transponders, only the corresponding transponder will transmit the signal on to the central system receiver.

According to a second preferred embodiment of the invention, the magnitude of the RSSI signals are compared to each other by a central system controller. In particular, when a tire pressure monitor transmits a tire pressure signal that is received by multiple transponders, all of the transponders then transmit the tire pressure signal, the RSSI signal and the transponder's unique identification code to the central system receiver. The central system receiver provides the data signals to the central system controller, which compares the various RSSI signals to each other. The central system controller determines that the transponder associated with the highest RSSI signal corresponds to the tire pressure monitor that transmitted the tire pressure signal. Accordingly, the central system controller indicates that the received tire pressure information corresponds to the tire associated with the transponder providing the highest RSSI value.

DETAILED DESCRIPTION OF PREFERRED EMBODIMENTS

Figure 1:
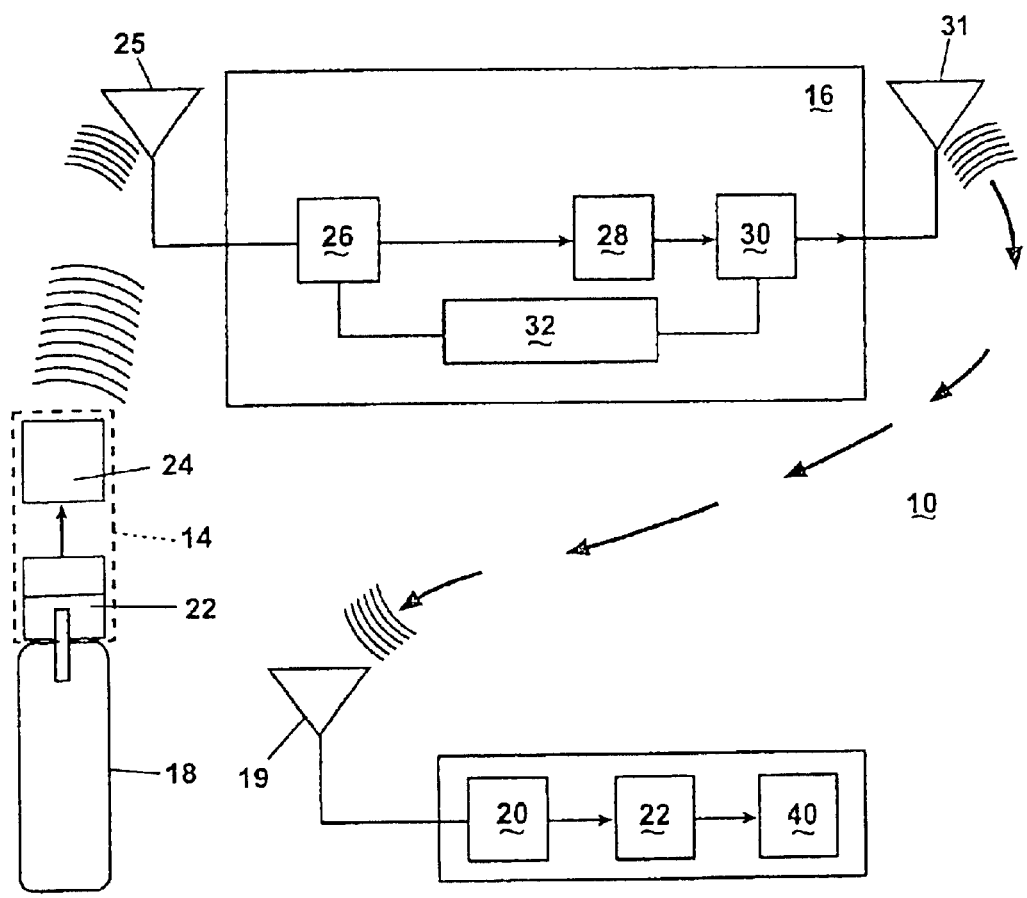
FIG. 1 is a block diagram of a tire pressure monitor and identification system in accordance with a preferred embodiment of the present invention.
Figure 2:
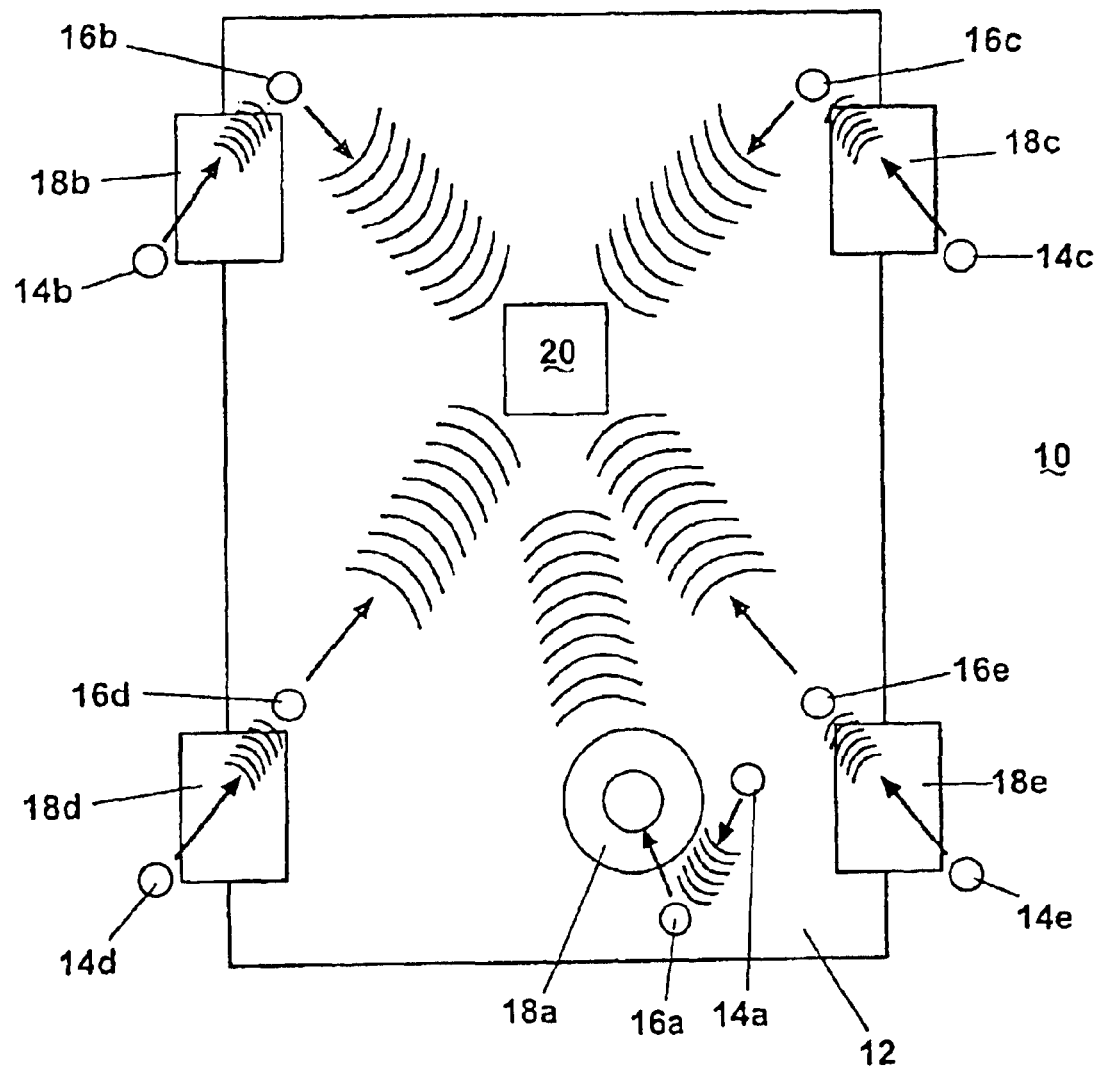
FIG. 2 is a schematic of a tire pressure monitor and identification system installed on a vehicle according to a preferred embodiment of the present invention.

Referring to FIGS. 1 and 2, a tire pressure monitor and identification system 10 for a vehicle 12 is shown. System 10 includes at least one tire pressure monitor 14 and at least one transponder 16 corresponding with each tire 18 (preferably including the spare tire 18a). System 10 further includes a central system receiver 20 that receives tire pressure and location information from the transponders 16 and provides such information to a central system controller 22, which processes the information and conveys it to the vehicle operator, preferably via a display mechanism 40.

Tire pressure monitor 14, as best seen in FIG. 1, includes a standard tire pressure sensor 22 connected in series with a tire pressure data transmitter 24. At least one tire pressure monitor 14 is mounted in each vehicle tire 18. Typically, tire pressure monitors 14 are mounted within the air valve stem (not shown) of the vehicle tire 18. In operation, sensor 22 collects data regarding tire pressure for the specific tire 18 to which it is mounted. Transmitter 24 then transmits the data to a transponder receiver, to be explained in further detail below, preferably via radio frequency (RF) signals. An example of a commercially-available and acceptable tire pressure monitor is the Manchester-encoded Schrader model 52088990AB monitor. Alternatively, the data could be transmitted from transmitter 24 to a receiver using an inductive (or magnetic), ultrasonic, or infra-red signals.

Each pressure monitor 14 corresponds to a particular transponder 16, which is fixedly-mounted to the vehicle relatively proximate to its corresponding pressure monitor. For example, transponders 16 may be mounted to the wheel well, the frame of the vehicle 12, or the axle of the vehicle tire 18, provided the transponder 16 is mounted relatively near its corresponding tire 18. For the spare tire 18a, transponder 16a is mounted in the trunk, adjacent to spare tire 18a. Preferably, transponders 16 are permanently connected to vehicle 12 during manufacture of the vehicle, such that transponders 16 are not intentionally or accidentally relocated. However, the invention contemplates after-market installation of system 10 such that transponders 16 may be bolted onto vehicle 12, or the like.

Each transponder 16, as best seen in FIG. 1, includes a tire pressure monitor signal receiver 26, a microprocessor 28, a transponder transmitter 30 and an antenna 31. Microprocessor 28 is a conventional microprocessor that includes read-only memory (ROM), random access memory (RAM) and a central processing unit (CPU). All components of each transponder 16 are preferably contained in a small housing, for ease of mounting and to reduce the likelihood of contaminants impairing the operation of transponder 16. When receiver 26 is adapted to receive a radio frequency (RF) signal, it typically includes its own receiving antenna 25. Each transponder 16 preferably further includes an independent power supply 32 so as to be totally self-contained and eliminate the need for any power cabling or coaxial cables. Preferably, power supply 32 is a long life battery. Alternatively, transponders 16 may be powered by the battery system of the vehicle 12.

Each transponder 16 is further equipped with a predetermined and unique location identification code. For example, for a system 10 having five transponders 16a, 16b, 16c, 16d, and 16e, the identification codes may be as follows: spare tire 18a-000, left front vehicle tire 18b-001; right front vehicle tire 18c-010; left rear vehicle tire 18d-011; right rear vehicle tire 18e-100. The unique identification codes are stored in the transponder's ROM memory and are used by the central system controller 22 to identify the tire location information.

Each transponder 16 preferably transmits data to the central system receiver 20 via radio frequency (RF), inductive (or magnetic), ultrasonic, or infra-red signals. However, the present invention is also applicable to systems wherein the transponders transmit tire pressure data to the central system receiver via hard-wired cables. When the data is transmitted via radio frequency, antenna 19 is used to receive the data. The central system receiver 20 provides the data to a central system controller 22, which is a conventional microprocessor having random access memory (RAM), read only memory (ROM), and a central processing unit (CPU). The controller 22 processes the data and provides tire pressure and location information to a vehicle display mechanism 40.

Now, the operation of the system will be described according to a first preferred embodiment of the invention.

Whenever a tire pressure monitor 14 transmits a tire pressure signal, the transponder 16 corresponding to the particular monitor 14 will receive the signal. Depending upon the positioning of the vehicle and a variety of other factors, one or more of the other non-corresponding transponders 16 may also receive the signal. Each transponder that receives the tire pressure signal also detects the strength of the received signal and derives an RSSI value that is indicative of the strength of the signal. Each transponder individually compares the RSSI value associated with the pressure signal to a reference value to determine the relative strength of the received pressure signal. If a transponder determines that the RSSI value is greater than the reference value, then the transponder combines the transponder's unique identification code with the received tire pressure signal and transmits both pieces of data to the central system receiver 20. If a transponder 16 determines that the RSSI value is less than the reference value, then the transponder 16 determines that the received signal was a stray signal from a non-corresponding tire pressure monitor, and the transponder does not transmit any data to the central system receiver 20. Thus, provided that the reference value is properly determined, only the corresponding transponder will transmit the tire pressure signal to the central controller, even if the signal is received by multiple transponders. When the central system receiver 20 receives a data packet, including a tire pressure signal and a transponder identification code, from a transponder 16, the central system controller 22 processes the data and provides tire pressure and location information to the vehicle operator, preferably via the vehicle display mechanism 40.

Figure 3:
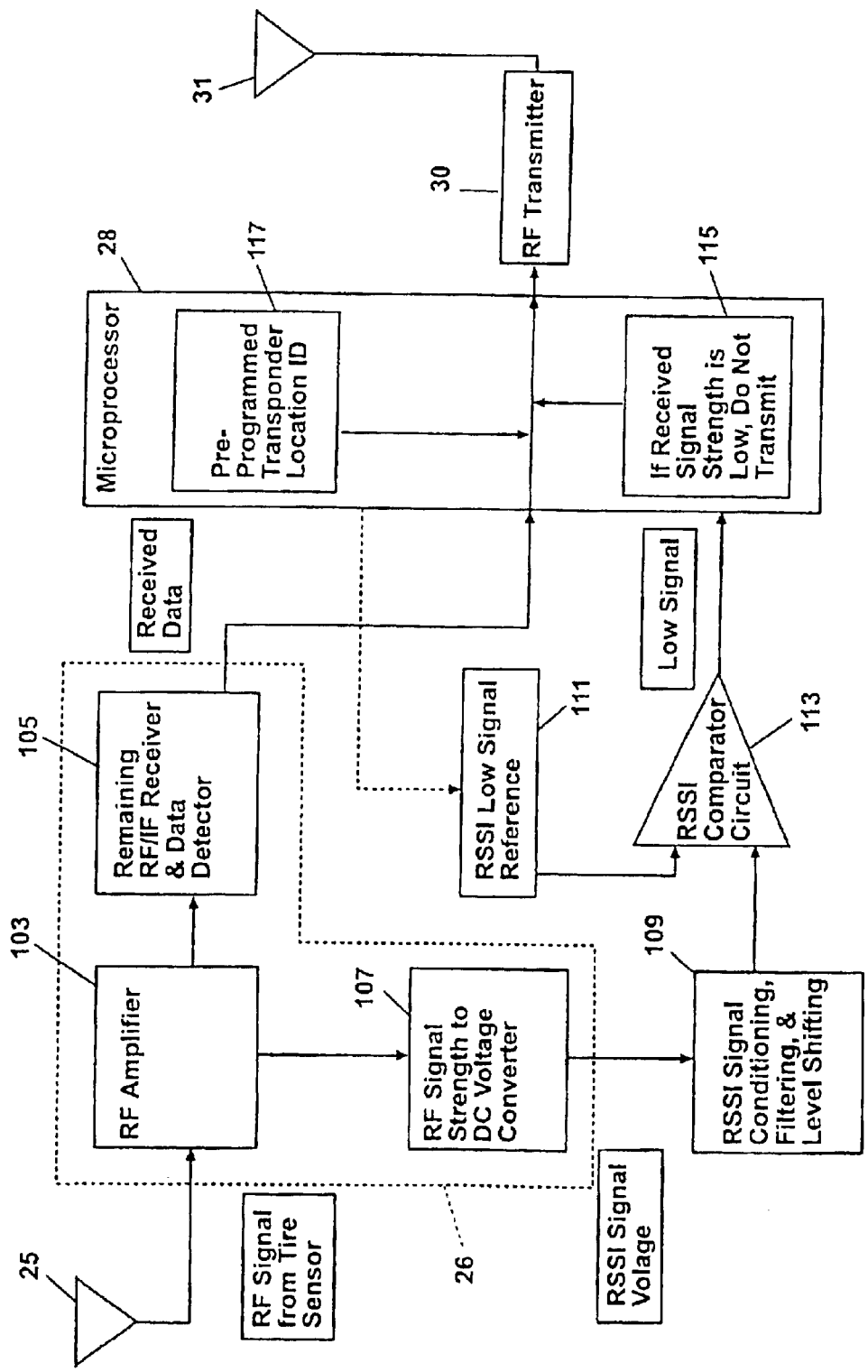
FIG. 3 is a functional block diagram of the transponders according to a first preferred embodiment of the invention.

The operation of the transponders, according to the first preferred embodiment of the invention, will now be described in more detail, with reference to FIG. 3. Like components in FIGS. 1 and 3, are shown with the same reference numerals. Specifically, referring to FIG. 3, receiving antenna 25 provides an incoming tire pressure signal to receiver 26. Receiver 26 processes the incoming tire pressure signal and detects an RSSI value associated with the incoming signal. In particular, the incoming tire pressure signal is provided to an RF amplifier 103 via receiving antenna 25. The RF amplifier amplifies the received tire pressure signal and provides the amplified signal to an RF/IF Receiver & Data Detector circuit 105. The RF/IF Receiver & Data Detector circuit mixes the amplified tire pressure signal with a local oscillator to produce an Intermediate Frequency (IF) signal. Then, the IF signal is filtered and amplified by the RF/IF Receiver & Data Detector circuit 105. The IF signal is then demodulated (because the tire pressure signal is modulated by the tire pressure monitors prior to transmitting) and the actual tire pressure value is detected. The tire pressure value is converted into a "Received Data" pulse train, which is provided to the microprocessor 28.

In addition to being provided to the RF/IF Receiver & Data Detector circuit 105, the received tire pressure signal is also provided to a voltage converter circuit 107, which converts the strength of the received tire pressure signal to a proportional DC voltage, referred to herein as the RSSI value. The conversion is normally a "log-linear" relationship, whereby the RSSI value is linearly proportional to the strength of the received tire pressure signal as measured in dBm. The RSSI value is appropriately filtered and amplified to eliminate electrical noise and produce a good signal strength average, according to methods that are well-known in the art, by signal conditioning circuit 109. Then, the RSSI signal is compared to the reference value (block 111) by an RSSI comparator circuit 113. The result of the comparison is provided to microprocessor 28.

Then, as shown at blocks 115 and 117, if the RSSI value is greater than the reference value, the microprocessor 28 appends a pre-programmed transponder identification code to the tire pressure signal to create a data packet and provides that data packet to the transmitter 30. The transmitter 30 transmits the entire data packet, including the tire pressure signal and the transponder identification code to the central controller via transmitter antenna 31. If the RSSI value is less than the reference value, the microprocessor 28 does not make a transmission.

The reference value, to which the RSSI value is compared by the transponders, can be either a constant value that is pre-determined at the time of manufacture, or it can be adaptively determined during operation of the system based upon prior RSSI values from the various tire pressure monitors. If the reference value is pre-determined, it should be set so that when a transponder receives a tire pressure signal from its corresponding tire pressure monitor, the RSSI value will always exceed the reference value. Further, the reference value should be set so that the RSSI value associated with a tire pressure signal received from a non-corresponding tire pressure monitor will be less than the reference value. Because the RSSI values will differ significantly depending upon the relative distances between the tire pressure monitor and the various transponders, an appropriate reference value can be easily determined by one skilled in the art from an empirical observation of the system outputs.

Instead of relying upon a pre-determined constant reference value, it is also possible, and within the scope of this invention, to adaptively-determine the reference value based upon prior RSSI signal from the various tire pressure monitors. That is, algorithms may be used by each of the transponders to "learn" over time an appropriate reference value. Accordingly, each transponder's microprocessor would determine the reference value (as shown by the dotted line in FIG. 3 between the microprocessor 28 and the reference value block 111). With this method, the transponders may have different reference values from each other, and the reference value for each of the transponders will vary from time to time over the course of their operation.

One preferred method of adaptively-determining the reference value is as follows. Each transponder stores all RSSI signals derived from tire pressure signals received by the respective transponders for a particular period of time. Each transponder then groups the stored RSSI signals according to their relative signal strengths. Because the tire pressure signals received from corresponding tire pressure monitors will be significantly stronger (and therefore the RSSI signals will be significantly greater), the transponders will group together all of the tire pressure signals received from the respective corresponding tire pressure monitors, and the transponders will group together all of the stray tire pressure signals. RSSI signals are grouped together if the mathematical difference between them is less than a pre-determined value. After each transponder categorizes its stored RSSI signals into two groups—corresponding signals (high RSSI values) and non-corresponding signals (low RSSI values)—each transponder calculates its respective average corresponding RSSI value and the average non-corresponding RSSI value. Finally, each transponder calculates its own reference value based on the mid-point value between the average corresponding RSSI value and the average non-corresponding RSSI value. As can be seen, each transponder may have different reference values, depending upon the strengths of the received signals. Further, this process can be applied iteratively so that the reference values may change over time, particularly as the batteries in the tire pressure monitors degrade.

Now, the operation of the system will be described according to a second preferred embodiment of the invention. As in the first preferred embodiment, a tire pressure signal transmitted by a tire pressure monitor 14 will be received by the corresponding transponder 16 as well as possibly other non-corresponding transponders 16. Further, upon receiving the tire pressure signal, each transponder detects the strength of the signal that it receives and derives an RSSI value therefrom. However, instead of comparing the respective RSSI values to reference values, each transponder combines the tire pressure signal, the transponder's unique identification code, and the RSSI value derived by that transponder, and transmits all three signals in a data packet to the vehicle's central system receiver 20. To avoid reception conflicts by the central system controller 22, the transponders 16 transmit their respective data packets at pre-defined time intervals.

Figure 4:
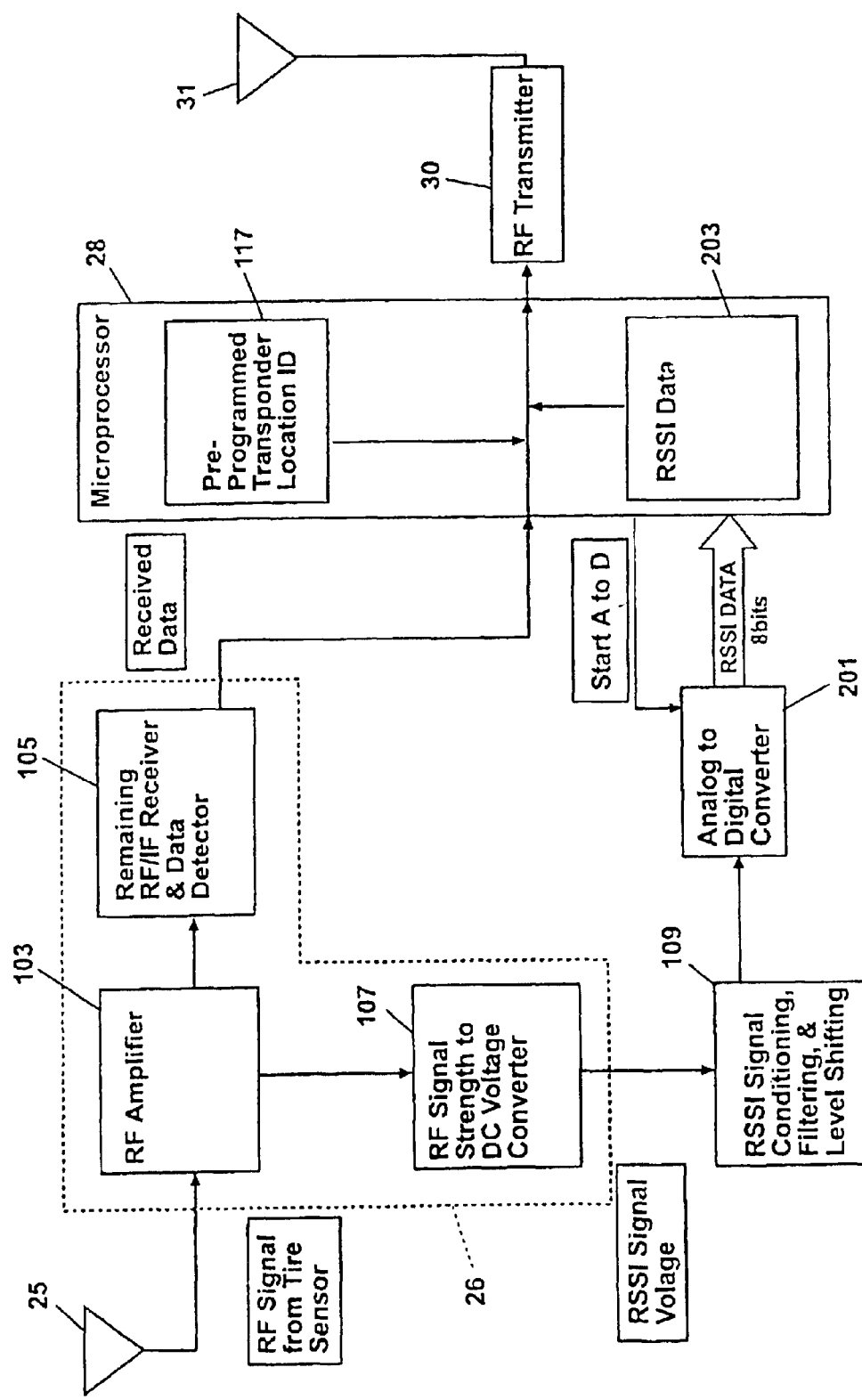
FIG. 4 is a functional block diagram of the transponders according to a second preferred embodiment of the invention.

The details of the operation of the transponders as employed in the second preferred embodiment of the invention will be described in more detail with reference to FIG. 4. FIG. 4 is similar to FIG. 3, and like components are referenced by the same numerals. Indeed, the operation of the transponders as used in the second preferred embodiment is the same as that used in the first preferred embodiment (as described hereinabove), with the following differences. In the second preferred embodiment, the RSSI value that is provided by the signal conditioning circuit 109 is provided to a conventional analog-to-digital ("A to D") converter 201 instead of a comparator circuit 113. The A to D converter 201 converts the analog RSSI signal to a digital signal and provides the digital RSSI signal to the microprocessor 28. The microprocessor 28 appends the digital RSSI signal (block 203) to the tire pressure signal along with the pre-programmed transponder identification code (block 117) to create a data packet, which is transmitted by the transmitter 30 via antenna 31.

Upon receiving the data packets from all of the transmitting transponders 16, the central system controller 22 compares the RSSI values associated with the various transponders to each other. The largest RSSI value is indicative of the strongest tire pressure signal and thus corresponds to the transponder located closest to and corresponding to the transmitting tire pressure monitor. Therefore, if, for example, the central system controller 21 determines that the left front transponder received the strongest tire pressure signal (based on the highest RSSI value), then the controller determines that the tire pressure information was derived from the left front tire. Then, the central system controller 21 provides the tire pressure information and tire location to the vehicle's display panel 40.

Some commercial tire pressure monitors 14 actually transmit tire pressure data in bursts such that the tire pressure data is transmitted several times in a short period of time. For example, the commercially-available Schrader tire pressure monitor transmits the same tire pressure data in bursts of eight transmissions per second. When the present invention is implemented using such tire pressure monitors, the transponders derive RSSI values for each of the data transmissions. The central system controller 22 then preferably calculates the average of the respective RSSI values associated with each of the transponders. Then, the central system controller 22 compares the averages of the RSSI values of the various transponders to each other. As above, the largest average RSSI value is indicative of the appropriate tire location.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A tire pressure monitor system for a vehicle, comprising:
   a means for receiving and transmitting pressure data; and
   wherein said receiving and transmitting means is adapted to determine whether a received pressure data was derived from an associated vehicle tire based upon a parameter relating to a physical distance between said vehicle tire and said receiving and transmitting means.

2. The system of claim 1, wherein said receiving and transmitting means is further adapted to receive said pressure data in the form of a wireless signal, and wherein said parameter relating to said physical distance between said vehicle tire and said receiving and transmitting means is determined based upon a strength of said wireless signal.

3. The system of claim 1, wherein said receiving and transmitting means is a transponder.

4. The system of claim 1, wherein said receiving and transmitting means is further adapted to selectively transmit said pressure data if said pressure data was derived from an associated vehicle tire.

5. The system of claim 4 further comprising a controller for receiving said transmitted pressure data from said receiving and transmitting means.

6. The system of claim 5, wherein said controller is adapted to provide information to a vehicle operator based upon said pressure data.

7. A tire pressure monitor system for a vehicle, comprising:
   a first means for receiving and transmitting pressure data, said first receiving and transmitting means adapted to determine a first parameter relating to a physical distance between said first receiving and transmitting means and a source of tire pressure data;
   a second means for receiving and transmitting pressure data, said second receiving and transmitting means adapted to determine a second parameter relating to a physical distance between said second receiving and said source of tire pressure data; and
   a means for comparing said first and second parameters.

8. The system of claim 7, wherein said first and second means for receiving and transmitting pressure data comprise first and second transponders; and wherein said comparing means comprises an electronic controller.

9. The system of claim 7, wherein said first and second receiving and transmitting means are adapted to receive said pressure data in the form of a wireless signal.

10. The system of claim 9, wherein said first parameter relates to a signal strength of a tire pressure signal received by said first receiving and transmitting means; and wherein said second parameter relates to a signal strength of said tire pressure signal received by said second receiving and transmitting means.

11. The system of claim 10, wherein said comparing means is further adapted to provide tire pressure information to a vehicle operator based upon a comparison between said first and second parameters.

12. The system of claim 11, wherein said comparing means is further adapted to provide information to said vehicle operator relating to the physical location of said tire pressure data source.

* * * * *